United States Patent
Chandra et al.

(10) Patent No.: US 10,545,854 B2
(45) Date of Patent: Jan. 28, 2020

(54) METHOD AND A SYSTEM FOR AUTOMATICALLY IDENTIFYING VIOLATIONS IN ONE OR MORE TEST CASES

(71) Applicant: Wipro Limited, Bangalore (IN)

(72) Inventors: Aman Chandra, Bangalore (IN); Varun Anant, Bangalore (IN)

(73) Assignee: Wipro Limited, Bangalore (IN)

( * ) Notice: Subject to any disclaimer, the term of this patent is extended or adjusted under 35 U.S.C. 154(b) by 285 days.

(21) Appl. No.: 15/242,891

(22) Filed: Aug. 22, 2016

(65) Prior Publication Data
US 2018/0004637 A1 Jan. 4, 2018

(30) Foreign Application Priority Data
Jul. 1, 2016 (IN) .............................. 201641022764

(51) Int. Cl.
*G06F 11/36* (2006.01)
*G06F 16/33* (2019.01)
*G06F 17/27* (2006.01)

(52) U.S. Cl.
CPC ...... *G06F 11/3672* (2013.01); *G06F 16/3344* (2019.01); *G06F 17/2725* (2013.01); *G06F 11/36* (2013.01); *G06F 17/277* (2013.01)

(58) Field of Classification Search
CPC ............. G06F 11/3672; G06F 11/3664; G06F 11/3668; G06F 11/3688; G06F 11/3692
(Continued)

(56) References Cited

U.S. PATENT DOCUMENTS 8,356,278 B2  1/2013 Drissi et al.
8,670,972 B1 * 3/2014 Varman et al. ..... G06F 11/3664
703/24
(Continued)

FOREIGN PATENT DOCUMENTS

EP        1 217 533      6/2002
WO    WO 2011/106197    9/2011

OTHER PUBLICATIONS

Extended European Search Report from the European Patent Office in counterpart European Application No. 16191604.4 dated May 26, 2017, 8 pages.

*Primary Examiner* — Wei Y Zhen
*Assistant Examiner* — Mohammed N Huda
(74) *Attorney, Agent, or Firm* — Finnegan, Henderson, Farabow, Garrett & Dunner, LLP

(57) ABSTRACT

The present disclosure is related in general to software testing and a method and a system for automatically identifying violation in the test cases. A test case validation system categorizes the test cases into event-based test cases and binary test cases. Further, a Part-Of-Speech (POS) pattern is detected in the one or more test cases based on POS tags assigned to each of the tokens in test cases. Thereafter, comparison of the detected POS pattern and the one or more tokens with predefined POS patterns and predefined tokens identifies violations in the one or more test cases if any, using pattern matching and Natural Language Processing (NLP). The predefined POS patterns and tokens used for comparison are filtered based on category of the test case thus accelerating the process of the violation identification. The test case validation system is capable of accurately identifying more than one type of violations simultaneously.

14 Claims, 4 Drawing Sheets

(58) Field of Classification Search
USPC .......................................................... 717/124
See application file for complete search history.

(56) References Cited

U.S. PATENT DOCUMENTS

| | | | |
|---|---|---|---|
| 2013/0097586 A1* | 4/2013 | Chandra et al. | G06F 11/3684 717/124 |
| 2014/0013307 A1* | 1/2014 | Hansson | G06F 11/3692 717/124 |
| 2014/0244241 A1 | 8/2014 | Ghaisas et al. | |
| 2015/0331847 A1 | 11/2015 | Jung et al. | |

* cited by examiner

METHOD AND A SYSTEM FOR AUTOMATICALLY IDENTIFYING VIOLATIONS IN ONE OR MORE TEST CASES

TECHNICAL FIELD

The present subject matter is related in general to software testing, and more particularly, but not exclusively to a method and a system for automatically identifying violations in one or more test cases.

BACKGROUND

Generally, quality of products and services delivered is one of the key components of a client-vendor relationship. The importance of quality of products and services cannot be overlooked. If there are any defects in the products and services that are not noticed during testing phase, the quality of the products and services is affected. These defects can be fixed in the later stage but fixing the defects at a later stage may be very expensive as compared to the expenses during the testing phase.

Further, in case of agile based development models which involve iterative development, performing testing process may be difficult as the outcome of the agile based development models becomes clear only upon performing repetitive modifications. As the repetitive modifications give very little time for complete functional understanding, the impact on the testing process is very high. Therefore, generating quality of the test cases to test the system becomes very important as there is very little time to complete the testing process. The test cases that are not well captured may suffer from many quality issues like Ambiguity, Pre-conditions, Completeness, Duplicity, Missing Steps and Missing Expected Result/Output.

Currently, some of the existing techniques manually identify the violations in the one or more test cases. But due to the huge volume of test cases and types of test cases involved, it is a very tedious and time consuming process to identify the violations manually. Also, a lot of resources are involved in the manual process. Further, in some of the existing techniques, violations in the one or more test cases are identified based on the metadata of a pattern detected in the test cases. Furthermore, the violations are identified based on skill and experience of a developer developing the test cases. But the existing methods are not generic and flexible for all kinds of development models such as agile based development models. Further, the existing techniques identify only one type of a violation at a given point of time.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein are a method and a system for automatically identifying violation in the one or more test cases. A test case validation system detects a Part-Of-Speech (POS) pattern in the one or more test cases based on the POS tags assigned to each of one or more tokens in the one or more test cases. Further, the one or more test cases are categorized as either event-based test cases or binary test cases based on the POS tags assigned to each of the one or more tokens in the one or more test cases. Thereafter, comparison of the detected POS pattern and the one or more tokens with predefined POS patterns and predefined tokens identifies violations in the one or more test cases if any, using a technique, for example pattern matching and Natural Language Processing (NLP). The predefined POS patterns and the predefined tokens used for the comparison are filtered based on the category of the test case, thus accelerating the process of violation identification. The test case validation system is capable of accurately identifying more than one type of violations simultaneously in each test case.

Accordingly, the present disclosure comprises a method for automatically identifying violations in one or more test cases. The method comprises retrieving, by a test case validation system, the one or more test cases comprising one or more tokens from a test case database associated with the test case validation system. Upon retrieving the one or more test cases, the test case validation system assigns a Part-Of-Speech (POS) tag to each of the one or more tokens of each of the one or more test cases. Further, the test case validation system categorizes each of the one or more test cases into at least one of a binary test case and an event-based test case based on the POS tag assigned to each of the one or more tokens of each of the one or more test cases. Further, the test case validation system detects a POS pattern of each of the one or more test cases based on one or more predefined rules. Thereafter, the test case validation system compares at least one of the POS patterns of each of the one or more test cases and the one or more tokens of each of the one or more test cases with at least one of predefined POS patterns and predefined tokens. The predefined POS patterns and the predefined tokens used for the comparison are based on the categorization of each of the one or more test cases. Finally, the test case validation system identifies a violation in the one or more test cases when a mismatch is identified during the comparison in at least one of the POS pattern of each of the one or more test cases and the predefined POS patterns and the one or more tokens of each of the one or more test cases and the predefined tokens.

Further, the present disclosure comprises a test case validation system for automatically identifying violations in one or more test cases. The test case validation system comprises a processor and a memory communicatively coupled to the processor, wherein the memory stores the processor-executable instructions, which, on execution, causes the processor to retrieve the one or more test cases, comprising one or more tokens, from a test case database associated with the test case validation system. Upon retrieving the one or more test cases, the processor assigns a Part-Of-Speech (POS) tag to each of the one or more tokens of each of the one or more test cases. Further, the processor categorizes each of the one or more test cases into at least one of a binary test case and an event-based test case based on the POS tag assigned to each of the one or more tokens of each of the one or more test cases. Upon categorizing the one or more test cases, the processor detects a POS pattern of each of the one or more test cases based on one or more predefined rules. Thereafter, the processor compare at least one of the POS pattern of each of the one or more test cases and the one or more tokens of each of the one or more test cases with at least one of predefined POS patterns and predefined tokens, wherein the predefined POS patterns and the predefined tokens used for the comparison are based on the categorization of each of the one or more test cases. Finally, the processor identifies a violation in the one or more test cases when a mismatch is identified during the comparison in at least one of the POS pattern of each of the one or more test cases and the predefined POS patterns and the one or more tokens of each of the one or more test cases and the predefined tokens.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
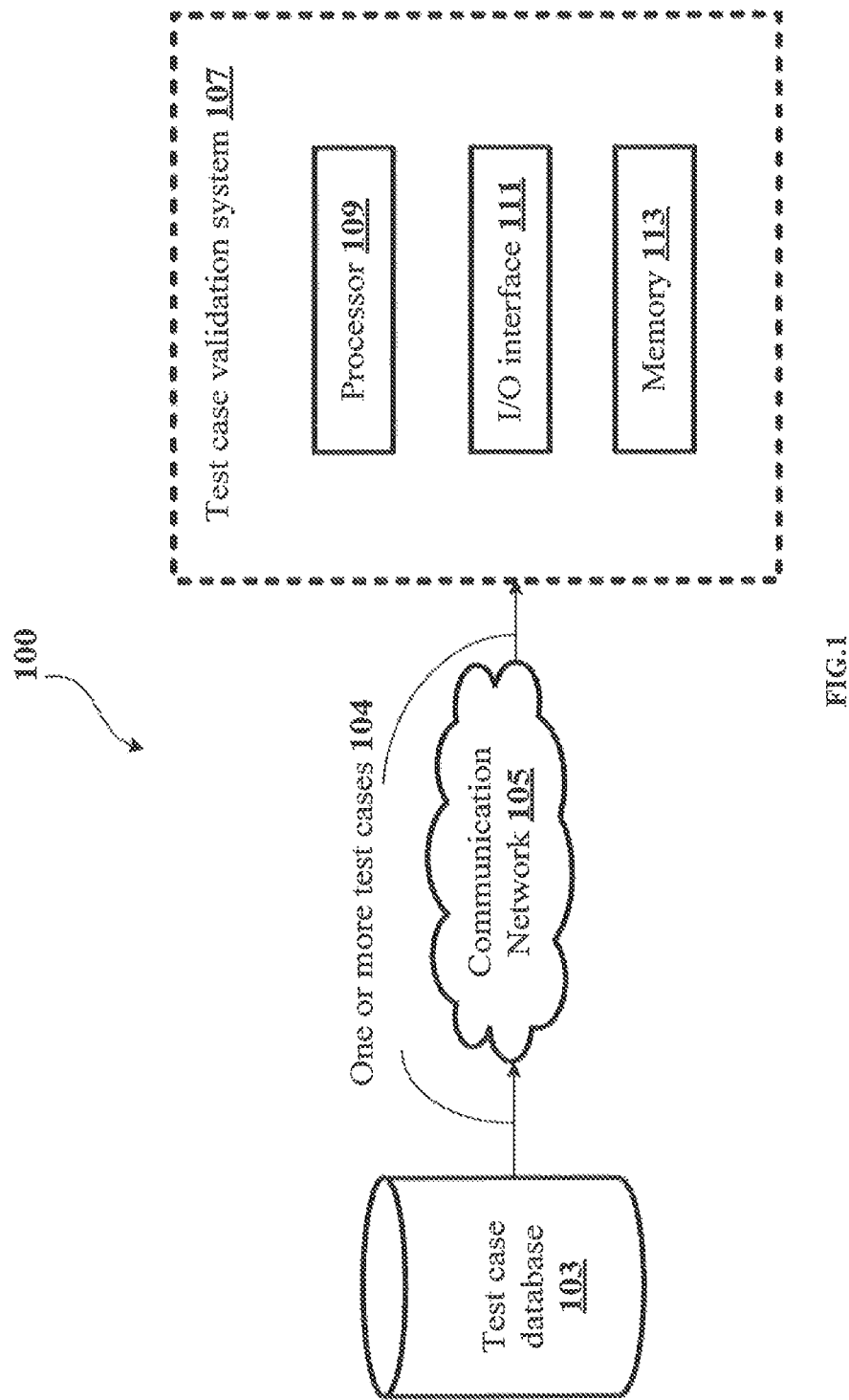
FIG. 1 shows an exemplary architecture for automatically identifying violations in one or more test cases in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method and a system for automatically identifying violations in one or more test cases. A test case validation system retrieves the one or more test cases comprising one or more tokens, from a test case database associated with the test case validation system. Upon retrieving the one or more test cases, the test case validation system assigns a Part-Of-Speech (POS) tag to each of the one or more tokens of each of the one or more test cases. Further, the test case validation system categorizes each of the one or more test cases into at least one of a binary test case and an event-based test case based on the POS tag assigned to each of the one or more tokens of each of the one or more test cases. In an embodiment, the event-based test cases are the test cases that comprise a subject, an object and a condition. An output result of the event-based test cases comprises performing an action specified in the client-based test cases based on the condition. Further, the binary test cases are the test cases that comprise the subject and the object without the condition. An output result of the binary test cases comprises providing a response i.e. at least one of "yes" or "no". Further, the test case validation system detects a POS pattern of each of the one or more test cases based on one or more predefined rules.

Thereafter, the test case validation system compares at least one of the POS pattern of each of the one or more test cases and the one or more tokens of each of the one or more test cases with at least one of predefined POS patterns and predefined tokens. In an embodiment, the predefined POS patterns and the predefined tokens are obtained from historic data related to the test cases. The predefined POS patterns and the predefined tokens used for the comparison are filtered based on the categorization. Therefore the process of identifying violations in one or more test cases gets accelerated with increase in speed of the comparison. Finally, the test case validation system identifies a violation in the one or more test cases when a mismatch is identified during the comparison in at least one of the POS pattern of each of the one or more test cases and the predefined POS patterns and the one or more tokens of each of the one or more test cases and the predefined tokens. The test case validation system is capable of identifying more than one type of violation simultaneously.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for automatically identifying violations in one or more test cases in accordance with some embodiments of the present disclosure.

The architecture 100 comprises a test case database 103, a communication network 105 and a test case validation system 107. The test case database 103 may be associated with the test case validation system 107. In an embodiment, the test case database 103 may be present within the test case validation system 107. In an alternative embodiment, the test case database 103 may be present outside the test case validation system 107. The test case database 103 comprises one or more test cases 104. The test case validation system 107 accesses one or more test cases 104 from the test case database 103 through the communication network 105. In an embodiment, the communication network 105 may be at least one of wired communication network and wireless communication network.

The test case validation system 107 comprises a processor 109, an I/O interface 111 and a memory 113. The I/O interface 111 retrieves the one or more test cases 104 from the test case database 103. The one or more test cases 104 comprise one or more tokens. A token is a word, a phrase, a symbol or an abbreviation in a test case. As an example, consider a test case "Verify whether system can send an SMS alert to user". The one or more tokens of the above mentioned test case may be "verify", "whether", "system", "can", "send", "an", "SMS", "alert", "to", and "user". Upon retrieving the one or more test cases 104 from the test case database 103, the one or more test cases 104 and the one or more tokens are stored in the memory 113. The memory 113 is communicatively coupled to the processor 109. The processor 109 assigns a Part-Of-Speech (POS) tag to each of the one or more tokens of each of the one or more test cases 104 and categorizes each of the one or more test cases 104 based on the POS tags assigned to each of the one or more tokens of each of the one or more test cases 104. The processor 109 detects a POS pattern of each of the one or more test cases 104 based on one or more predefined rules. The processor 109 identifies violation in one or more test cases 104 by comparing at least one of the POS pattern of each of the one or more test cases 104 and one or more tokens of each of the one or more test cases 104 with predefined POS patterns and predefined test cases. In an embodiment, the predefined POS patterns and the predefined tokens are stored in the memory 113.

Figure 2:
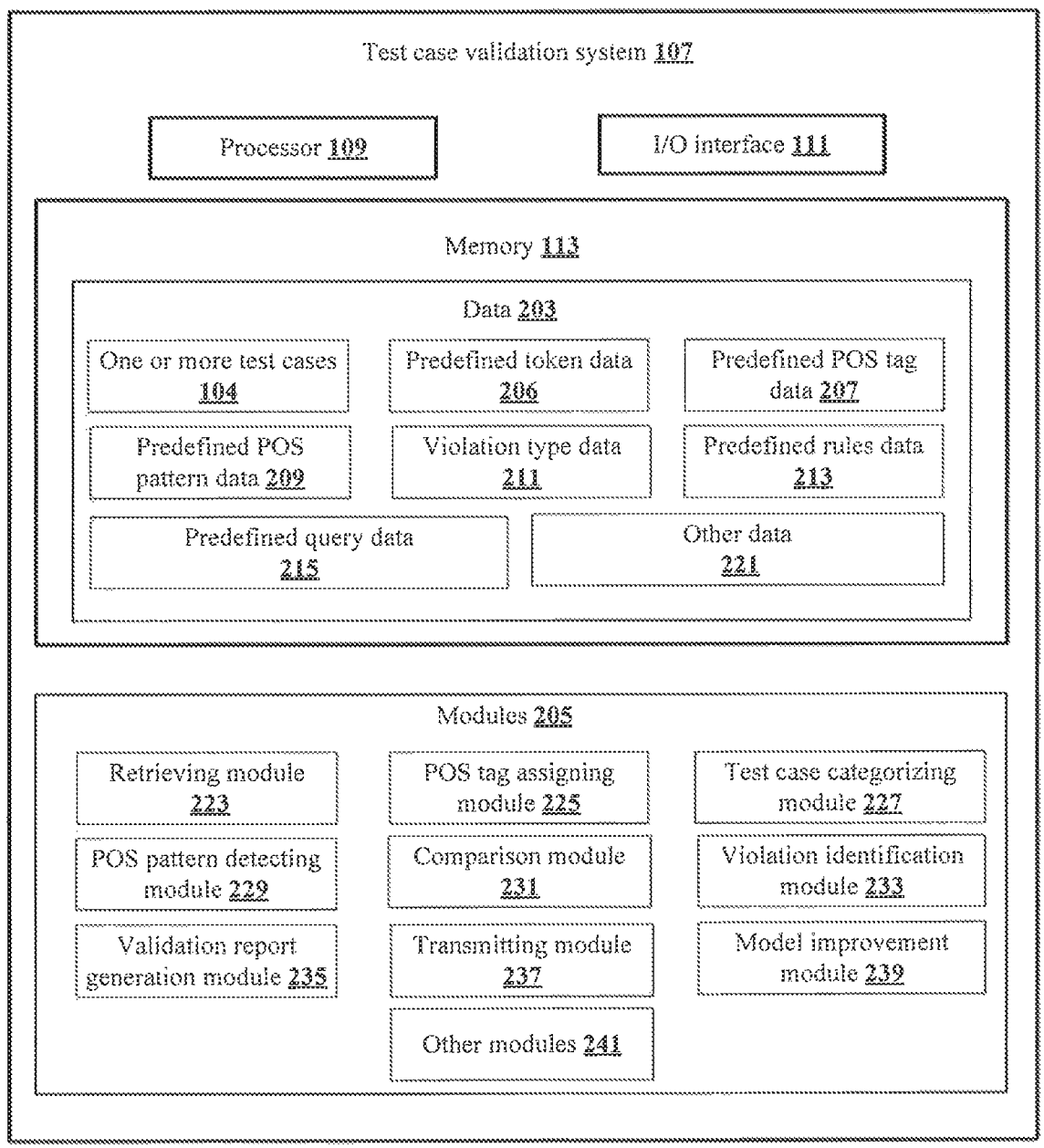
FIG. 2 shows a detailed block diagram of a test case validation system for automatically identifying violations in one or more test cases in accordance with some embodiments of the present disclosure.

FIG. 2 shows a detailed block diagram of test case validation system for automatically identifying violations in one or more test cases in accordance with some embodiments of the present disclosure.

In one implementation, the test case validation system 107 retrieves the one or more test cases 104 from a test case database 103 associated with the test case validation system 107. As an example, the one or more test cases 104 retrieved are stored in the memory 113 configured in the test case validation system 107 as shown in the FIG. 2. In one embodiment, data 203 includes one or more test cases 104, predefined token data 206, predefined Part-Of-Speech (POS) tag data 207, predefined POS pattern data 209, violation type data 211, predefined rules data 213, predefined query data 215 and other data 221. In the illustrated FIG. 2, modules 205 are described herein in detail.

In one embodiment, the data may be stored in the memory 113 in the form of various data structures. Additionally, the aforementioned data can be organized using data models, such as relational or hierarchical data models. The other data 221 may store data, including temporary data and temporary files, generated by modules 205 for performing the various functions of the test case validation system 107.

In an embodiment, the one or more test cases 104 are retrieved from the test case database 103. The one or more test cases 104 comprise one or more tokens. The one or more tokens are stored in the memory 113. As an example, consider a test case "Verify whether system can send an alert to user". The one or more tokens of the above mentioned test case may be "verify", "whether", "system", "can", "send", "an", "alert", "to", and "user".

In an embodiment, the predefined token data 206 comprises predefined tokens that may be present in the one or more test cases. As an example, the predefined tokens may be "more", "less", "whether", "minimum", "maximum" etc.

In an embodiment, the predefined POS tag data 207 comprises POS tags that may be assigned to the one or more tokens of the one or more test cases 104. As an example, the POS tags may include, but not limited to, Coordinating conjunction (CC), Cardinal number (CD), Determiner (DT), Existential there (EX), Foreign word (FW), Preposition or subordinating conjunction (IN), Adjective (JJ), Adjective, comparative (JJR), Adjective, superlative (JJS), List item marker (LS), Modal (MD), Noun, singular or mass (NN), Noun, plural (NNS), Proper noun, singular (NNP), Proper noun, plural (NNPS), Predeterminer (PDT), possessive ending (POSe), Personal pronoun (PRP), Possessive pronoun (PRP$), Adverb (RB), Adverb, comparative (RBR), Adverb superlative (RBS), Particle (RP), Symbol (SYM), to (TO), Interjection (UH), Verb base form (VB), Verb past tense (VBD), Verb gerund or present participle (VBG), Verb past participle (VBN), Verb, non-third person singular present (VBP), Verb third person singular present (VBZ), Wh-determiner (WDT), Wh-pronoun (WP), Possessive wh-pronoun (WP$) and Wh-adverb (WRB).

In an embodiment, the predefined POS pattern data 209 comprises predefined POS patterns that are extracted from historic data stored in the memory 113. As an example, the predefined POS pattern of an event-based test case may comprise POS tags representing a subject, an object and a condition. As an example, the predefined POS pattern of a binary test case may comprise POS tags representing only the subject and the object.

In an embodiment, the violation type data 211 comprises predefined violation types that may be detected in the one or more test cases 104. In an embodiment, the predefined violation types may include, but not limited to, ambiguity, pre-conditions, completeness, duplicity, missing steps, expected results, naming convention and post-conditions. The below Table 1 describes the predefined violation types with an example for each predefined violation type.

TABLE 1

| Violation Type | Definition of the violation type | Example |
| --- | --- | --- |
| Ambiguity | When one or more test cases can be interpreted in more than one way which leads to lack of clarity in the artifact, then the one or more test cases are said to be ambiguous. | Example 1: consider a test case "Verify that the system should start in a minimum time". The above test case mentioned in example 1, the token "minimum" |

TABLE 1-continued

| Violation Type | Definition of the violation type | Example |
| --- | --- | --- |
| | | makes the test case ambiguous as it has no definite interpretation and can be perceived as per individual's choice. |
| Pre-conditions | Pre-conditions are assumptions and conditions (such as infra setup or test data creation) that must be satisfied before one or more test cases are executed | Example 2: consider a test case "Verify whether the system sends an alert to the user" The above test case mentioned in Example 2, does not specify the pre-conditions of the test case i.e. the test case does not capture the information related to when the alert should be sent to the user. |
| Completeness | Completeness of the one or more test cases refers to identifying incomplete test cases i.e. when the one or more test cases fail to capture necessary entities and actions, then the one or more test cases are said to be incomplete. | Example 3: Consider a test case "The System should" In the test case mentioned in Example 3, the necessary entities and the actions are not captured. Therefore the test case is incomplete. |
| Duplicity | Duplicity occurs when the one or more test cases occur more than once. | — |
| Missing Steps | Missing Steps denote that the one or more test cases do not cover all the steps that have to be performed using the one or more test cases. | Example 4: consider a test case "Verify whether the modified values for options are saved in database". The above test case mentioned in example 4 does not have the necessary steps to achieve the end result i.e. how to verify whether the modified vahles are saved in the database is not mentioned in the test case. |
| Expected Results | This violation type occurs when expected result may be missing in the one or more test cases. | Example 5: consider a test case "Verify the help functionality by logging in to the home page and clicking on the help manual" The above test case mentioned in Example 5, does not specify the final expected result upon executing the test case i.e. what should be looked for while verifying the help functionality is not mentioned. |
| Naming Convention | This violation type occurs when name given to the one or more test cases is different from details specified in the test case description. | Example 6: Consider Title of a test case is: "TC_01_Login". Test case description: "Verify whether the user can place an order in the portal" In the above title and the description of the test case mentioned in example 6, the description of the test case does not match with the title of the test case. |
| Post-conditions | This violation occurs when the one or more test cases do not capture end state upon executing the test case successfully. | Example 7: consider a test case "Verify whether the system is able to store error codes" In the above test case mentioned in Example 7, the test case clearly states |

TABLE 1-continued

| Violation Type | Definition of the violation type | Example |
|---|---|---|
| | | what is expected but the test case fails to capture where the action ("store error codes") should be executed. |

In an embodiment, the predefined rules data 213 comprises the one or more predefined rules used for identifying violations in the one or more test cases. As an example, the one or more predefined rules may be as shown in the below Table 2.

TABLE 2

| Rule number | Predefined rule |
|---|---|
| RULE 1 | 1. Tokens such as "when" assigned with POS tag "WRB" represent conditions.<br>2. Tokens such as "In case of", "if", "On + verb + ing" as an example "On clicking" represent conditions. |
| RULE 2 | 1. Tokens such as "within", "less than", "more than" etc. represent criteria.<br>2. Tokens such as "less than", "more than" should be followed by a number.<br>As an example, "less than 5 seconds", "more than 2 options" etc. |
| RULE 3 | 1. Tokens like "example", "such as" etc. represent elaboration of the one or more test cases |
| RULE 4 | 1. Test cases should not start with a preposition or a conjunction.<br>2. Test cases should not end with a preposition or a conjunction. |
| RULE 5 | 1. Event-based test cases should have a subject, an object and a condition.<br>2. Binary test cases should have a subject and an object. |

In an embodiment, the predefined query data 215 comprises one or more predefined queries that are triggered by the test case validation system 107. As an example, the one or more predefined queries may be "check for POS tag indicating the subject", "check for POS tag indicating the Object", "check whether the condition is complete" etc. In an embodiment, one or more queries can be dynamically generated. The one or more predefined queries are triggered based on the one or more predefined rules.

In an embodiment, the data stored in the memory 113 is processed by the modules 205 of the test case validation system 107. The modules 205 may be stored within the memory 113. In an example, the modules 205 communicatively coupled to a processor 109 configured in the test case validation system 107, may also be present outside the memory 113 as shown in FIG. 2 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a retrieving module 223, a POS tag assigning module 225, a test case categorizing module 227, a POS pattern detecting module 229, a comparison module 231, a violation identification module 233, a validation report generation module 235, a transmitting module 237, a model improvement module 239 and other modules 241. The other modules 241 may be used to perform various miscellaneous functionalities of the test case validation system 107. It will be appreciated that such aforementioned modules 205 may be represented as a single module or a combination of different modules.

In an embodiment, the retrieving module 223 retrieves the one or more test cases 104 from the test case database 103 and stores it in the memory 113. The one or more test cases 104 comprise the one or more tokens.

In an embodiment, the POS tag assigning module 225 assigns the POS tags to each of the one or more tokens of each of the one or more test cases 104. In an embodiment, the POS tag assigning module 225 assigns POS tags to each of the one or more tokens by extracting one test case at any given instant.

In an embodiment, the test case categorizing module 227 categorizes the one or More test cases 104. In an embodiment, the one or more test cases 104 may be categorized into at least one of the event-based test cases and binary test cases. The event-based test cases comprise a subject, an object and a condition. An output result of the event-based test cases comprises performing an action specified in the event-based test cases based on the condition. As an example, consider a test case "verify whether system can send an SMS alert to a user in case of a withdrawal". In this example, the token "system" indicates the subject, the token "user" indicates the object, "in case of a withdrawal" indicates the condition. Since the test case comprises the subject, the object and the condition, the test case is categorized as the event-based test case. Therefore, the output result of the test case is sending an SMS alert upon satisfying the condition "in case of a withdrawal".

The binary test cases comprise the subject and the object without the condition. An output result of the binary test cases comprises providing a response i.e. at least one of "yes" or "no". As an example, consider a test case "verify that options are displayed in menu area". In this case, the options indicate the subject, the menu area indicates the object and displaying indicates the action. Since the test case comprises the subject and the object, the test case is categorized as the binary test case. Therefore, the output result of the test case is "yes" if the options are displayed in the menu area. If the options are not displayed in the menu area, then the output result of the test case is "No". In an embodiment the test case categorizing module 227 may further cluster the one or more test cases 104 which are similar.

In an embodiment, the POS pattern detecting module 229 detects a POS pattern of each of the one or more test cases 104 upon categorization. The POS pattern is detected based on the POS tags assigned to each of the one or more tokens in each of the one or more test cases 104.

In an embodiment, the comparison module 231 compares the POS pattern of each of the one or more test cases 104 with the predefined POS patterns by triggering the one or more predefined queries. The one or more predefined queries are triggered based on the one or more predefined rules. The predefined POS patterns used for the comparison are based on the categorization of the one or more test cases 104. The POS pattern of each of the event-based test cases is compared with the predefined POS patterns related to the event-based test cases. The POS pattern of each of the binary test cases is compared with the predefined POS patterns related to the binary test cases. Further, the comparison module 231 compares the one or more tokens of each of the one or more test cases 104 with the predefined tokens by triggering the one or more predefined queries based on the one or more predefined rules. The predefined tokens used for the comparison are based on the categorization of the one or more test cases 104. The one or more tokens of each of the event-based test cases are compared with the predefined tokens related to the event-based test cases. The one or more tokens of each of the binary test cases are compared with the predefined tokens related to the binary test cases. If new POS patterns and new tokens are detected, the comparison module 231 activates the model improvement module 239.

In an embodiment, the model improvement module 239 provides a notification to a user when the new POS patterns and the new tokens are detected by the comparison module 231. The user dynamically updates the predefined POS patterns and the predefined tokens upon receiving the notification.

In an embodiment, the violation identification module 233 identifies violations in the one or more test cases 104. The violation identification module 233 identifies the violations in the one or more test cases 104 when a mismatch is identified in the POS pattern of each of the one or more test cases 104 and the one or more predefined POS patterns during the comparison. Further, the violation identification module 233 identifies the violations in the one or more test cases 104 when a mismatch is identified in the one or more tokens of each of the one or more test cases 104 and the predefined tokens during the comparison. Upon identifying the violations in the one or more test cases 104, the violation identification module 233, tags information related to the violation with the corresponding one or more test cases 104. The information related to the violation may include, but not limited to, the violation type and description of the violation.

In an embodiment, the validation report generation module 235 dynamically generates a validation report. The validation report indicates overall summary of data related to the violations in the one or more test cases 104. As an example, the overall summary in the violation report may include, but not limited to, number of violations identified in each of the one or more test cases 104, the violation types, description of the violations, one or more test cases 104 in which the violations were identified, category of the one or more test cases 104, total number of violations identified and clusters to which the one or more test cases 104 belong. An exemplary validation report is as shown in the below Table 3.

TABLE 3

| Test case | Category of the test case | Violation type | Description of the violation | Cluster that the test case belongs to | Total number of violations in the test case | Status |
| --- | --- | --- | --- | --- | --- | --- |
| Test case A | Binary test case | "Missing steps" | The one or more steps to execute the test case are missing in the test case | Cluster 1 | 1 | Violation present |
| Test case B | Event-based test case | "pre-condition" | Pre-conditions are assumptions and conditions (such as infra setup or test data creation) that must be satisfied before one or more test cases are executed | Cluster 1 | 2 | Violation present |
| | | "Ambiguity" | The test case can be interpreted in more than one way which leads to lack of clarity in the artifact | | | |
| Test case C | Binary test case | — | — | Cluster 3 | 0 | Violation not present |
| Test case D | Event-based test case | "Naming convention" | Name given to the test case is different | Cluster 5 | 1 | Violation present |

TABLE 3-continued

| Test case | Category of the test case | Violation type | Description of the violation | Cluster that the test case belongs to | Total number of violations in the test case | Status |
|---|---|---|---|---|---|---|
| | | | from details specified in the test case description. | | | |

In an embodiment, the transmitting module 237 transmits the generated validation report to a user associated with the test case validation system 107. The user performs one or more corrections to the one or more test cases 104 based on the generated validation report. Upon performing the one or more corrections, the user provides the corrected one or more test cases 104 to the test case validation system 107 for further validation.

Scenario-1

Consider a test case 1 "Verify whether system can send an SMS alert to the user in case of a withdrawal". The one or more tokens of the test case 1 may be "verify", "whether", "system", "can", "send", "an", "SMS", "alert", "to", "the", "user", "in", "case", "of", "a", "withdrawal". The test case validation system 107 assigns a POS tag to each of the one or more tokens of the test case 1. As an example, the POS tag assigned to each of the one or more tokens of the test case 1 is as shown in the below Table 4.

TABLE 4

| Token Number | Token | POS tag |
|---|---|---|
| 1. | Verify | NNP |
| 2. | Whether | IN |
| 3. | System | NNP |
| 4. | Can | MD |
| 5. | Send | VB |
| 6. | An | DT |
| 7. | SMS | NNS |
| 8. | Alert | JJ |
| 9. | To | TO |
| 10. | The | DT |
| 11. | User | NN |
| 12. | In | IN |
| 13. | Case | NN |
| 14. | Of | IN |
| 15. | A | DT |
| 16. | Withdrawal | NN |

Based on the POS tag assigned to each of the one or more tokens of test case 1, the test case validation system 107 identifies that the test case 1 is the event-based test case. The test case validation system 107 detects the POS pattern in the test case 1 to compare with the predefined POS patterns. In an embodiment, the predefined POS patterns may be defined based on possible permutations and combinations of the POS tags assigned to the one or more tokens of the one or more test cases. Exemplary POS tags assigned to the one or more tokens of the test case 1 are illustrated in the above Table 4. Based on the assigned POS tags, as an example, the POS pattern of the test case 1 may be "NNP IN NNP MD VB DT NNS JJ TO DT NN IN NN IN DT NN". The test case validation system 107 compares the detected POS pattern with the predefined POS patterns related to the event-based test cases and the one or more tokens of the test case 1 with the predefined tokens related to the event-based test cases. The test case validation system 107 triggers the one or more predefined queries based on the one or more predefined rules for the comparison. As an example, the one or more predefined queries may be "check for POS tag related to subject", "check for POS tag related to the object", "check for the POS tag related to the action" etc. Based on the comparison, the test case validation system 107 identifies the subject which is "System" in the test case 1, the object which is "User" in the test case 1, and the action which is "Send SMS" in the test case 1. Upon removing the identified subject, the object and the action from the POS pattern, the remaining POS tags are IN NN IN DT NN. The test case validation system 107 checks if the remaining POS tags indicate the precondition based on which the action may be performed. The one or more predefined queries triggered by the test case validation system 107 for the remaining POS tags may be "check for POS tags related to the precondition". Based on, the one or more predefined rules, the test case validation system 107 checks for the presence of the POS tag "IN" and the POS tag "NN" in the remaining POS tags. Since the POS pattern matched with the predefined POS pattern that the test case validation system 107 was comparing with, no violation is identified. The test case validation system 107 notifies the user that no violation was identified in the test case 1 via the validation report.

Scenario-2

Consider a test case 2 "Verify whether system can send an SMS alert to the user". The one or more tokens of the test case 2 may be "verify", "whether", "system", "can", "send", "an", "SMS", "alert", "to", "the" and "user". The test case validation system 107 assigns a POS tag to each of the one or more tokens of the test case 2. As an example, the POS tag assigned to each of the one or more tokens of the test case 2 is as shown in the below Table 5.

TABLE 5

| Token Number | Token | POS tag |
|---|---|---|
| 1. | Verify | NNP |
| 2. | Whether | IN |
| 3. | System | NNP |
| 4. | Can | MD |
| 5. | Send | VB |
| 6. | An | DT |
| 7. | SMS | NNS |
| 8. | Alert | JJ |
| 9. | To | TO |
| 10. | The | DT |
| 11. | User | NN |

Based on the POS tag assigned to each of the one or more tokens of test case 2, the test case validation system 107 identifies that the test case 2 is the event-based test case. The test case validation system 107 detects the POS pattern in the test case 2 to compare with the predefined POS patterns. Exemplary POS tags assigned to the one or more tokens of the test case 2 are illustrated in the above Table 5. Based on the assigned POS tags, as an example, the POS pattern of the test case 2 may be "NNP IN NNP MD VB DT NNS JJ TO DT NN". The test case validation system 107 compares the detected POS pattern of the test case 2 with the predefined POS patterns related to the event-based test cases and the one or more tokens of the test case 2 with the predefined tokens related to the event-based test cases. The test case validation system 107 triggers the one or more predefined queries based on the one or more predefined rules for the comparison. As an example, the one or more predefined queries may be "check for POS tag related to subject", "check for POS tag related to the object", "check for the POS tag related to the action" etc. Based on the comparison, the test case validation system 107 identifies the subject which is "System" in the test case 2, the object which is "User" in the test case 2, and the action which is "Send SMS" in the test case 2. Upon removing the identified subject, the object and the action from the POS pattern, there are no POS tags remaining. Therefore, the test case validation system 107 identifies that the precondition is missing in the test case 2. The test case validation system 107 tags the violation "Missing precondition" to the test case 2 and notifies the user via the validation report.

Scenario-3

Consider a test case 3 "Verify that status of job in Tasks tab when import of minimum options from the store fails". The one or more tokens of the test case 3 may be "verify", "that", "status", "of", "job", "in", "tasks", "tab", "when", "import", "of", "minimum", "options", "from", "the", "store" and "fails". The test case validation system 107 assigns a POS tag to each of the one or more tokens of the test case 3. As an example, the POS tag assigned to each of the one or more tokens of the test case 3 is as shown in the below Table 6.

TABLE 6

| Token Number | Token | POS tag |
| --- | --- | --- |
| 1. | Verify | NNP |
| 2. | That | IN |
| 3. | Status | NN |
| 4 | Of | IN |
| 5. | Job | NN |
| 6. | In | IN |
| 7. | Tasks | NNP |
| 8. | Tab | NN |
| 9. | When | WRB |
| 10. | Import | NN |
| 11. | Of | IN |
| 12. | Minimum | JJ |
| 13. | Options | NNS |
| 14. | From | IN |
| 15. | The | DT |
| 16. | Store | NN |
| 17. | Fails | NNS |

Based on the POS tag assigned to each of the one or more tokens of test case 3, the test case validation system 107 identifies that the test case 3 is the event-based test case. The test case validation system 107 detects the POS pattern in the test case 3 to compare with the predefined POS patterns. Exemplary POS tags assigned to the one or more tokens of the test case 3 are illustrated in the above Table 6. Based on the assigned POS tags, as an example, the POS pattern of the test case 3 may be "NNP IN NN IN NN IN NNP NN WRB NN IN JJ NNS IN DT NN NNS". The test case validation system 107 compares the detected POS pattern with the predefined POS patterns related to the event-based test cases and the one or more tokens of the test case 3 with the predefined tokens related to the event-based test cases. The test case validation system 107 triggers the one or more predefined queries based on the one or more predefined rules for the comparison. As an example, the one or more predefined queries may be "check for POS tag related to subject", "check for POS tag related to the object", "checks for POS tag related to action", "checks for POS tag related to condition" "check for the token "minimum" or "maximum"" etc. Based on the comparison, the test case validation system 107 identifies the subject which is "status" in the test case 3, the object which is "tasks tab" in the test case 3, and the condition which is "when import of minimum options from the store fails" in the test case 3. Upon removing the identified subject, the object and the condition from the POS pattern, there are no other remaining POS tags. Therefore, the test case validation system 107 identifies a violation that POS tag indicating "action" is missing in the test case. Therefore, the POS pattern did not match with the predefined POS pattern that the test case validation system 107 was comparing with. The test case validation system 107 tags the violation as "incomplete test case". Further, the test case validation system 107 detects the presence of the token "minimum" in the test case 3. According to the one or more predefined rules, the token "minimum" should always be followed by a number. If the token "minimum" is not followed by a number, then the token "minimum" has no definite interpretation. The test case validation system 107 identifies that there is no number appearing after the token "minimum" in the test case 3. Therefore, the test case validation system 107 tags the violation as "Ambiguous". Finally, the test case validation system 107 notifies the user about the two different violation types "incomplete test case" and "Ambiguous" identified simultaneously in the test case 3 via the validation report.

Scenario 4

Consider a test case 4 "Verify whether the modified values for options are saved in database". The one or more tokens of the test case 4 may be "verify", "whether", "the", "modified", "values", "for", "options", "are", "saved", "in" and "database". The test case validation system 107 assigns a POS tag to each of the one or more tokens of the test case 3. As an example, the POS tag assigned to each of the one or more tokens of the test case 3 is as shown in the below Table 7.

TABLE 7

| Token Number | Token | POS tag |
| --- | --- | --- |
| 1. | Verify | NNP |
| 2. | whether | IN |
| 3. | the | DT |
| 4. | modified | VBD |
| 5. | values | NNS |
| 6. | for | CC |
| 7. | options | NNS |
| 8. | are | VB |
| 9. | saved | VBD |
| 10. | in | IN |
| 11. | database | NNP |

Based on the POS tag assigned to each of the one or more tokens of test case 4, the test case validation system 107 identifies whether the test case 4 comprises a pre-condition. If the test case 4 does not comprise the pre-condition, the test case validation system 107 verifies whether output of the test case 4 is in terms of "Yes" or "No". Based on the POS tags assigned to the one or more tokens in the test case 4, the test case validation system 107 identifies that the pre-condition is not present. Further, the test case validation system 107 identifies that output of the test case 4 is in terms of "Yes"

or "No". Therefore, the test case validation system 107 categorizes the test case 4 as a binary test case. Further, the test case validation system 107 detects the POS pattern in the test case 4 to compare with the predefined POS patterns. Exemplary POS tags assigned to the one or more tokens of the test case 4 are illustrated in the above Table 7. Based on the assigned POS tags, as an example, the POS pattern of the test case 4 may be "NNP IN DT VBD NNS CC NNS VB VBD IN and NNP". The test case validation system 107 compares the detected POS pattern with the predefined POS patterns related to the binary test cases and the one or more tokens of the test case 4 with the predefined tokens related to the binary test cases. The test case validation system 107 triggers the one or more predefined queries based on the one or more predefined rules for the comparison. As an example, the one or more predefined queries may be "check for POS tag related to subject", "check for POS tag related to the object", "check for POS tag related to action", "check for exaggeration" etc. Based on the comparison, the test case validation system 107 identifies the subject which is "modified values for options" in the test case 4, the object which is "database" in the test case 4, and the action is "saved" in the test case 4. Upon removing the identified subject, the object and the action from the POS pattern, there are no other remaining POS tags. Therefore, the test case validation system 107 identifies a violation that POS tags indicating "exaggeration" i.e. steps to execute the test case 4 are missing. Therefore, the POS pattern did not match with the predefined POS pattern that the test case validation system 107 was comparing with. The test case validation system 107 tags the violation as "Missing steps". Finally, the test case validation system 107 notifies the user about the violation "Missing steps" via the validation report.

Figure 3:
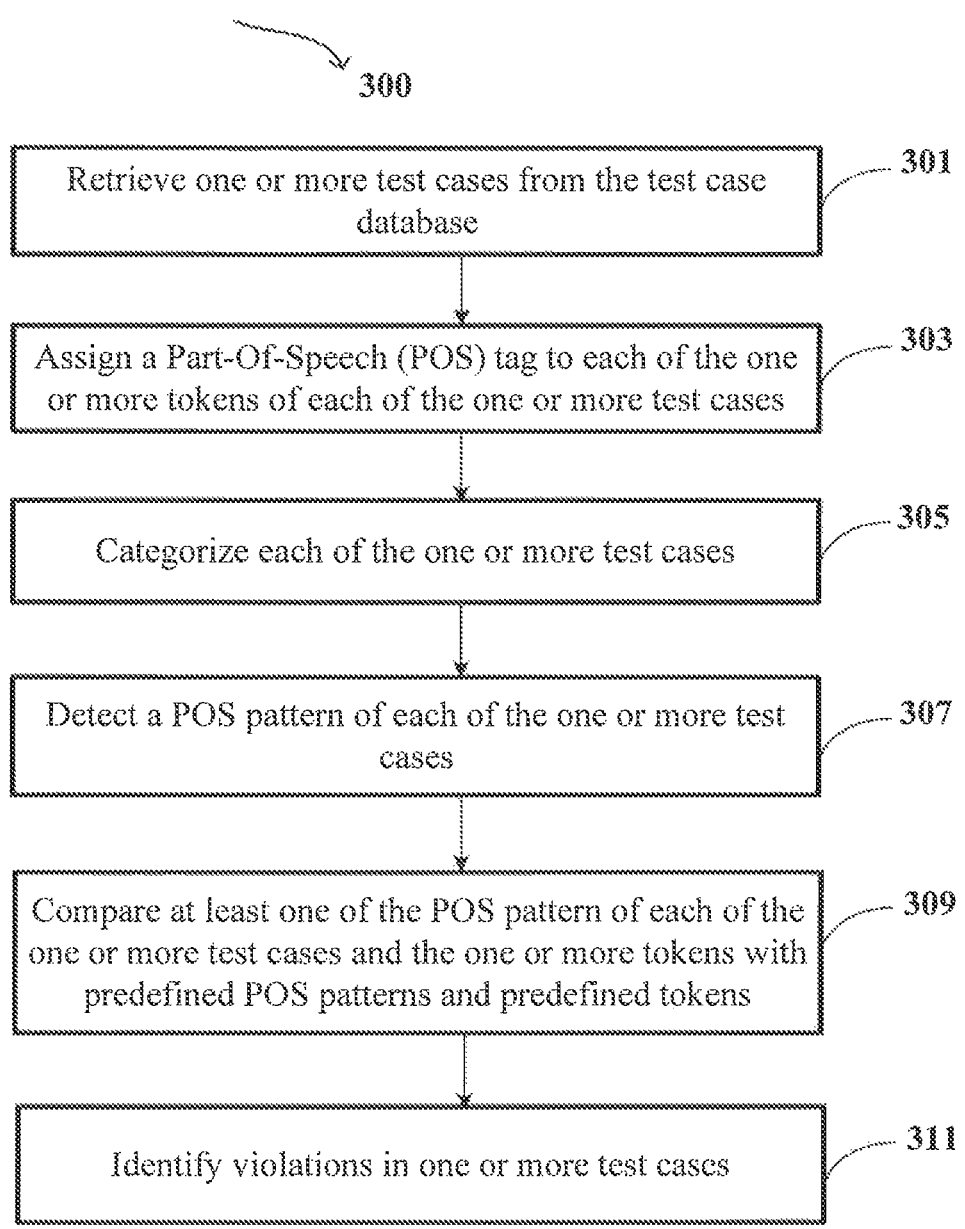
FIG. 3 shows a flowchart illustrating method for automatically identifying violations in one or more test cases in accordance with some embodiments of the present disclosure.

FIG. 3 shows a flowchart illustrating method for automatically identifying violations in one or more test cases in accordance with some embodiments of the present disclosure.

As illustrated in FIG. 3, the method 300 comprises one or more blocks illustrating a method for automatically identifying violations in one or more test cases 104. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the one or more test cases 104 are retrieved by the test case validation system 107. In an embodiment, a processor 109 of the test case validation system 107 retrieves the one or more test cases 104 from a test case database 103 associated with the test case validation system 107. The one or more test cases 104 comprise the one or more tokens.

At block 303, Part-Of-Speech (POS) tags are assigned by the test case validation system 107. In an embodiment, the processor 109 assigns the POS tags to each of the one or more tokens of each of the one or more test cases 104.

At block 305, the one or more test cases 104 are categorized by the test case validation system 107. In an embodiment, the processor 109 categorizes the one or more test cases 104 into at least one of event-based test cases and binary test cases. The event-based test cases comprise a subject, an object and a condition. An output result of the event-based test cases 104 comprises performing an action specified in the event-based test cases based on the condition. The binary test cases comprise the subject and the object without the condition. An output result of the binary test cases comprises providing a response i.e. at least one of "yes" and "no".

At block 307, a POS pattern of each of the one or more test cases 104 is detected by the test case validation system 107. In an embodiment, upon categorization, the processor 109 detects the POS pattern of each of the one or more test cases 104 based on the POS tags assigned to each of the one or more tokens in each of the one or more test cases 104.

At block 309, comparison of the POS pattern is performed. In an embodiment, the processor 109 compares the POS pattern of each of the one or more test cases 104 with the predefined POS patterns by triggering one or more predefined queries stored in the memory 113. The one or more predefined queries are triggered based on the one or more predefined rules. The predefined POS patterns used for the comparison arc based on the categorization of the one or more test cases 104. Further, the processor 109 compares the one or more tokens of each of the one or more test cases 104 with the predefined tokens by triggering the one or more predefined queries based on the one or more predefined rules. The predefined tokens used for the comparison are also based on the categorization of the one or more test cases 104.

At block 311, violations in the one or more test cases 104 are identified by the test case validation system 107. In an embodiment, the processor 109 identifies the violations in the one or more test cases 104 when a mismatch is identified in the POS pattern of each of the one or more test cases 104 and the one or more predefined POS patterns during the comparison. Further, the processor 109 identifies the violations in the one or more test cases 104 when a mismatch is identified in the one or more tokens of each of the one or more test cases 104 and the predefined tokens during the comparison. Upon identifying the violations in the one or more test cases 104, the processor 109 tags data related to the violation with the corresponding one or more test cases 104. Further, a validation report is generated by the processor 109 indicating overall summary of data related to the violations in the one or more test cases 104.

Figure 4:
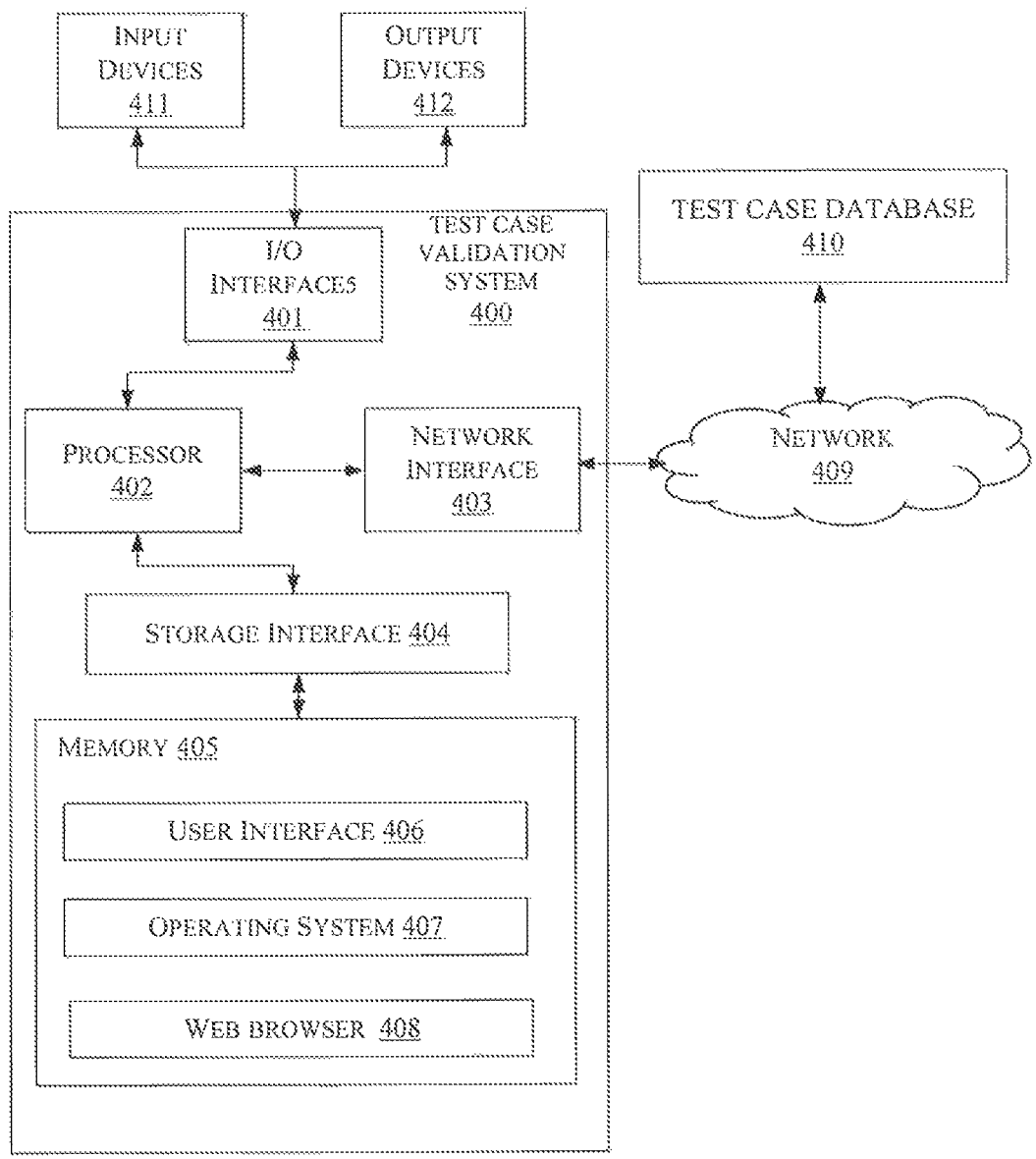
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, the test case validation system 400 is used for automatically identifying violations in one or more test cases 104. The test case validation system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.a/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the test case validation system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the test case validation system 400 may communicate with one or more data sources 410(a, ..., n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control, Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The test case database 410 comprises one or more test cases.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE 1394, Universal Serial Bus (USB), fiber channel, Small Computer Systems interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, the test case validation system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the test case validation system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces provide computer interaction interface elements on a display system operatively connected to the test case validation system 400, such as cursors, icons, check boxes, menus, scrollers, windows, widgets, etc. Graphical User interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the test case validation system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the test case validation system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the test case validation system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method and a system for automatically identifying violations in one or more test cases.

The present disclosure provides a feature wherein the one or more test cases are validated using Natural Language Processing (NLP) and pattern matching techniques providing increased accuracy and flexibility.

The present disclosure provides a feature wherein more than one category of violations is identified in each test case using multi label classification.

The present disclosure provides an unsupervised method of identifying the violations in the test cases automatically, which in turn reduces time and efforts of testers significantly.

The present disclosure also provides a supervised method to identify the violations in new tokens and new POS patterns of the test cases.

The present disclosure ensures improved accuracy over time and domain and rules for context sensitive classification.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for automatically identifying violations in one or more test cases. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | Architecture |
| 103 | Test case database |
| 104 | One or more test cases |
| 105 | Communication network |
| 107 | Test case validation system |
| 109 | Processor |
| 111 | I/O interface |
| 113 | Memory |
| 203 | Data |
| 205 | Modules |
| 206 | Predefined token data |
| 207 | Predefined Part-Of-Speech (POS) tag data |
| 209 | Predefined POS pattern data |
| 211 | Violation type data |
| 213 | Predefined rules data |
| 215 | Predefined query data |
| 221 | Other data |
| 223 | Retrieving module |
| 225 | POS tag assigning module |
| 227 | Test case categorizing module |
| 229 | POS pattern detecting module |
| 231 | Comparison module |
| 233 | Violation identification module |
| 235 | Validation report generation module |
| 237 | Transmitting module |
| 239 | Model improvement module |
| 241 | Other modules |

What is claimed is:

1. A method for automatically identifying violations in one or more test cases, the method comprising:

retrieving, by a test case validation system, the one or more test cases, comprising one or more tokens, from a test case database associated with the test case validation system;

assigning, by the test case validation system, a Part-Of-Speech (POS) tag to each of the one or more tokens of each of the one or more test cases;

categorizing, by the test case validation system, each of the one or more test cases into at least one of a binary test case and an event-based test case based on the POS tag assigned to each of the one or more tokens of each of the one or more test cases, wherein the event-based test cases are the test cases that comprise a subject, an object and a condition, wherein the binary test cases are the test cases that comprise the subject and the object;

detecting, by the test case validation system, a POS pattern of each of the one or more test cases based on one or more predefined rules;

comparing, by the test case validation system, at least one of the POS pattern of each of the one or more test cases and the one or more tokens of each of the one or more test cases with at least one of predefined POS patterns and predefined tokens, wherein the predefined POS patterns and the predefined tokens used for the comparison are based on the categorization of each of the one or more test cases; and identifying, by the test case validation system, a violation in the one or more test cases based on the comparison.

2. The method as claimed in claim 1, wherein the violation in the one or more test cases is identified when a mismatch occurs in at least one of:

the POS pattern of each of the one or more test cases and the predefined POS patterns; and the one or more tokens of each of the one or more test cases and the predefined tokens.

3. The method as claimed in claim 1 further comprises generating, by the test case validation system, a validation report comprising data related to the violation in the one or more test cases.

4. The method as claimed in claim 3, wherein the validation report is provided to a user for performing one or more corrections to the one or more test cases.

5. The method as claimed in claim 1, wherein the predefined POS patterns and the predefined tokens are dynamically updated.

6. The method as claimed in claim 1, wherein the categorization of the one or more test cases into the binary test case is based on determining presence of the POS tags representing a subject and an object in the one or more test cases.

7. The method as claimed in claim 1, wherein the categorization of the one or more test cases into the event-based test case is based on determining presence of the POS tags representing a subject, an object and a condition in the one or more test cases.

8. A test case validation system for automatically identifying violations in one or more test cases, the test case validation system comprising:
   a processor; and
   a memory communicatively coupled to the processor, wherein the memory stores the processor-executable instructions, which, on execution, causes the processor to:
   retrieve the one or more test cases, comprising one or more tokens, from a test case database associated with the test case validation system;
   assign a Part-Of-Speech (POS) tag to each of the one or more tokens of each of the one or more test cases;
   categorize each of the one or more test cases into at least one of a binary test case and an event-based test case based on the POS tag assigned to each of the one or more tokens of each of the one or more test cases, wherein the event-based test cases are the test cases that comprise a subject, an object and a condition, wherein the binary test cases are the test cases that comprise the subject and the object;
   detect a POS pattern of each of the one or more test cases based on one or more predefined rules;
   compare at least one of the POS pattern of each of the one or more test cases and the one or more tokens of each of the one or more test cases with at least one of predefined POS patterns and predefined tokens, wherein the predefined POS patterns and the predefined tokens used for the comparison are based on the categorization of each of the one or more test cases; and
   identify a violation in the one or more test cases when a mismatch is identified based on the comparison.

9. The test case validation system as claimed in claim 8, wherein the processor identifies the violation in the one or more test cases when a mismatch occurs in at least one of:
   the POS pattern of each of the one or more test cases and the predefined POS patterns; and
   the one or more tokens of each of the one or more test cases and the predefined tokens.

10. The test case validation system as claimed in claim 8, wherein the processor generates a validation report comprising data related to the violation in the one or more test cases.

11. The test case validation system as claimed in claim 10, wherein the processor provides the validation report to a user for performing one or more corrections to the one or more test cases.

12. The test case validation system as claimed in claim 8, wherein the processor dynamically updates the predefined POS patterns and the predefined tokens.

13. The test case validation system as claimed in claim 8, wherein the categorization of the one or more test cases into the binary test case is based on determining presence of the POS tags representing a subject and an object in the one or more test cases.

14. The test case validation system as claimed in claim 8, wherein the categorization of the one or more test cases into the event-based test case is based on determining presence of the POS tags representing a subject, an object and a condition in the one or more test cases.

* * * * *